July 20, 1965  S. C. PANDOLFO III  3,196,034
TAB FOR HOLDING FILM ON A REEL
Filed July 25, 1961
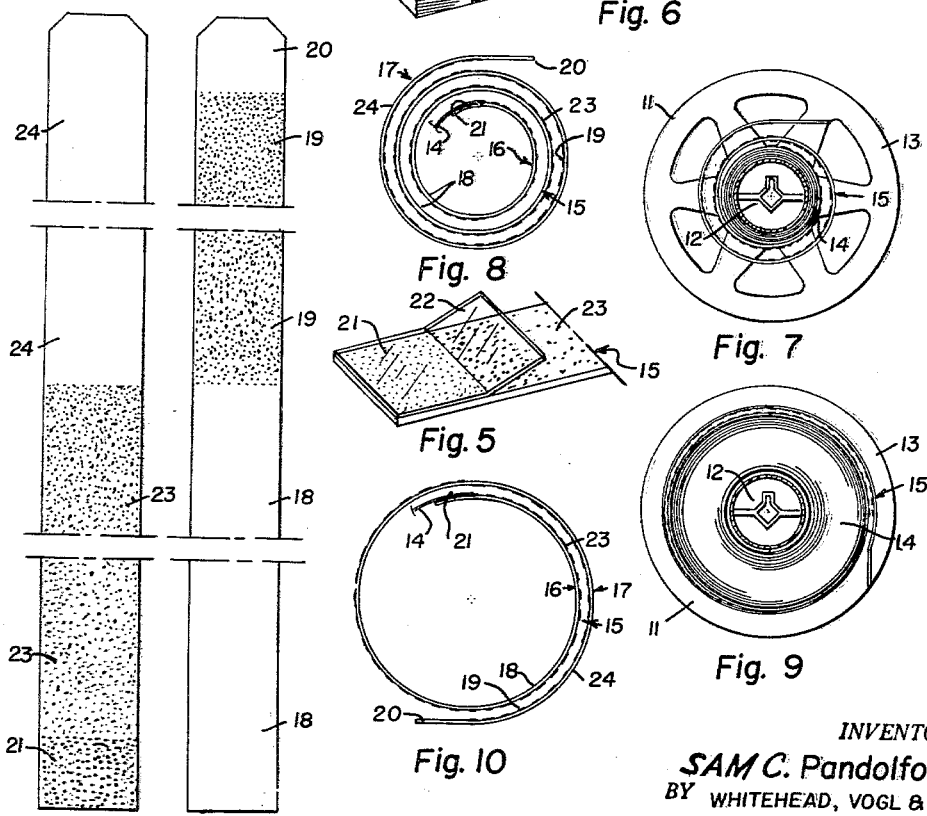
INVENTOR.
SAM C. Pandolfo III
BY WHITEHEAD, VOGL & LOWE
PER *Frank C. Lowe*
ATTORNEYS

United States Patent Office 3,196,034
Patented July 20, 1965

---

1

3,196,034
TAB FOR HOLDING FILM ON A REEL
Sam C. Pandolfo III, 933 S. Euclid Way,
Denver 9, Colo.
Filed July 25, 1961, Ser. No. 126,593
12 Claims. (Cl. 117—44)

This invention relates to means for holding and fastening the loose end of a film or tape on a reel and more particularly to an improved means for holding the loose end of a film or tape which has been wound upon a reel which employs an adhesive coated extension of the tape to effect the fastening operation.

With the widespread use of tape recorders and the almost fantastic increase in the use of microfilming to preserve records and the like, the manner of handling and storing such films and tapes has created several problems. As a practical matter, such films and tapes, which are hereinafter also referred to as films, are almost always wound and kept on reels. In each instance, although tapes for tape recording purposes and film strips for microfilms, for preserving records, are in completely different commercial activities, both are handled and stored in practically the same manner. One end of a ribbon of film is affixed to the hub of a reel and the film, usually of a synthetic resin or commonly called, plastic material, such a Mylar or cellulose acetate is wound upon the reel. The loose end of the film must be held in some manner when a reel is not in use and one common mode of holding it is to wrap a rubber band or a string about the film on the wound reel. As a further refinement a strip of paper having a button at one end and a string at the other may be wrapped about the reel and the string secured about the button. As a further expedient a short length of Scotch tape may be used to stick the end of the film to itself.

None of these expedients are entirely satisfactory. A rubber band leaves the film exposed and unprotected and may produce a deleterious sulphurizing action on the film. The paper wrap is generally satisfactory except for the difficulty and time consumed in applying it, and the Scotch tape mode of sticking is the least desirable of all. This is especially so with microfilm records where hundreds of reels are used and where it is desired to fully protect the film and at the same time to unwrap a reach of film to obtain a reference frame and then rewrap the film for storage. Time and tidiness in such an operation are essential factors.

It was with such in view that the present invention was conceived and developed for use with microfilm and also for use with tape recording tapes or film and the like. The invention comprises, in essence, a fastening strip adapted to be affixed to the end of a film, to be wrapped about itself when the film is wound upon a reel and to adhesively hold the film in place on the reel. It is further contemplated that a selected type of adhesive shall be appropriately disposed upon this fastening strip in such a manner as to permit repeated fastening and release of the strip as the film is repeatedly used and replaced for storage.

It follows that an object of the invention is to provide a novel and improved fastening strip for protectively covering and holding film in position on a reel when the reel is in storage.

A further object of the invention is to provide a novel and improved fastening strip for film which will immediately seal upon itself and thereby affix the loose end of a film in a tightly wound position upon the reel and prevent spontaneous unwrapping of the film from the reel when it is in storage.

Another object of the invention is to provide a novel and improved fastening strip for the end of a film on a reel capable of repeatedly adhering to itself and thereby eliminating the use of strings, buttons or the like for holding the film.

Another object of the invention is to provide a new and improved fastening strip for the end of a microfilm which may fasten the microfilm in position in its reel and which is especially adapted to repeatedly release and fasten the film.

Another object of the invention is to provide a novel and improved fastening strip which may be used with tapes for a tape recorder to hold the tape on a reel and which may be also easily affixed to and removed from the spindle of a tape recording machine when the tape is in use.

Yet another object of the invention is to provide a novel and improved fastening strip for reel mounted films which is a versatile, reliable, easily packaged, cheap unit and is especially simple to use.

With the foregoing and other objects in view, all of which more fully hereinafter appear, my invention comprises certain improved constructions, combinations and arrangements of parts and elements as hereinafter described, defined in the appended claims and illustrated in preferred embodiment in the accompanying drawing in which:

FIGURE 1 is a side elevational view of a reel carrying a reach of film, with the end of the film extending therefrom, with my improved fastening strip attached thereto and with the film being twisted to show the underside of the improved fastening strip and with portions of the strip being broken away to conserve space.

FIGURE 2 is similar to FIG. 1, but with the film being twisted to show the upper side thereof.

FIGURE 3 is a plan view of the upper side of the improved fastener strip, with portions broken away to show parts otherwise hidden from view.

FIGURE 4 is a plan view similar to FIG. 3, but showing the under side of the fastening strip.

FIGURE 5 is a fragmentary sectional detail of an end of the fastener strip having a special adhesive portion thereon and illustrating further, a means of protecting the adhesive portion until the strip is ready for use.

FIGURE 6 is a reduced-scale perspective view of a bundle of fastener strips illustrative of one manner in which they may be packaged.

FIGURE 7 is a diagrammatic, sectional view of the fastener strip and film as it would appear when wrapped about a reel, with only a small amount of film thereon, and with the portions of the strip being open as preliminary to adhereing the strip upper surface to its under surface.

FIGURE 8 is a diagrammatic line view of the positioning of the fastener strip per se illustrated at FIG. 7 indicating the circumferential reach of the various adhesive portions thereon.

FIGURE 9 is a transverse sectional view similar to FIG. 7 but illustrating the fastener strip holding a maximum amount of film on a reel.

FIGURE 10 is a diagrammatic line diagram of the fastener strip per se when positioned as illustrated at FIG. 9.

Referring more particularly to the drawing, a standard reel 11 is formed with a hub 12 and flanges 13 to carry a ribbon of film 14 with the film being wrapped about the hub and held in position and protected by the flanges of the reel. This common reel construction is used with recording tape, microfilm and with many other types of film. The present invention contemplates a fastener strip 15 which is affixed to the end of the film. The fastener strip 15 is preferably formed of a good grade of paper or like material having sufficient thickness and strength to adequately serve the purpose at hand, and which, on a unit base, is of insignificant cost. The strip is substantially the same width as the film, and its length is such as to permit it to at least be wrapped completely about the body of the film after the film has been wrapped upon the reel. Its function is to hold the body of film in place for storage and until it is ready for use. It is contemplated that the proportions of the fastener strip will be standardized for standard types of film, such as 5 mm. film, 8 mm. film and the like, and that its length will also be standardized for selected purposes as commonly used in the trade.

One type of film illustrative of an application of the invention, is a microfilm carried upon a standard size reel for storage in a library. Actually, a small amount of microfilm may be placed upon a given reel or a reel may be practically full, as in the manner comparatively illustrated at FIGS. 7 and 9. It is contemplated that the fastening strip will be standardized in its length to properly cover and protect either a small amount or large amount of film wound on a reel. A preferred length for the strip, is that which will be sufficient to be wrapped completely about a fully loaded reel at least one and one-half times to allow for overlap as hereinafter described.

In microfilm records where film exposures extend to the end of the film without any reach of blank or unexposed film at the end, it is essential that the film be protected from substances such as rubber, latex and other adhesives which would in time mar the film. Accordingly, in accordance with the invention, the fastener strip 15 is formed with a designated undersurface 16 which will lie against the surface of the film when the strip is wrapped upon the reel and with a designated outer surface 17 which will then be exposed. These under and outer surfaces 16 and 17 are divided into specified portions or reaches and a selected type of adhesive is applied to certain of the reaches at both sides, as hereinafter described.

One end of the fastener strip 15 is affixed to the end of the film 14 as hereinafter described, and, that end of the strip may be conveniently referred to as the inner-end and the opposite end of the strip referred to as the outer-end. A first reach 18 commences at the inner-end of the strip and at the undersurface of the strip. This reach is uncoated and untreated. This reach will lie against the film 14 wound upon the reel and its length is such that when the strip is completely wound about a full reel 11, as illustrated at FIG. 9, the uncoated first reach 18 completely embraces and protectively confines the film. Beyond this uncoated reach 18 the undersurface is coated with an adhesive, hereafter described, through a second reach 19. This reach extends to a point near the outer-end of the fastener strip 15, and a third, short uncoated reach 20 at the outer-end of the strip, form a finger tab to facilitate grasping the fastener strip as in disconnecting it from a wound up reel.

The outer surfaces 17 may be described as being divided into similar reaches. Commencing at the inner end where the fastener strip connects with the film there is a first short film connecting-reach 21. At this reach there is applied to the outer surface 17 a selected, tenacious adhesive of a type which will permanently bond to the plastic film. A number of such adhesives are commonly available. Ordinarily, adhesives of this type are so tenacious that they will stick to practically any substance they come in contact with and it is contemplated that in the manufacture and packaging of the fastener strips 15, a protective pad 22 of wax paper or the like may be used protectively to cover this end until the fastener strip is ready for use, as in the manner illustrated at FIG. 5.

Beyond the film connecting-reach 21, there is a connective coated reach 23 which is coated with an adhesive as hereinafter described and which substantially opposes the first uncoated reach 18 at the undersurface heretofore described. Beyond this connective reach 23, there is an uncoated exposed reach 24 which extends to the end of the fastener strip and which is substantially in opposition with the second coated reach 19 and this uncoated reach includes the tab 20 formed at the outer-end of the strip.

The adhesive at the second reach 19 at the undersurface 16 and the connective reach 23 at the outer surface 17 is of a distinctive type and may be generally characterized as being an adhesive which may be effectively and tightly bonded when initially applied to the paper or material forming the strip 15; further, of having a surface which will adhere to a like-coated surface but which will not adhere to uncoated or unlike-coated surfaces. Also, in the present invention an important characteristic is that the degree of adherence of the surface of the adhesive to like-coated surfaces is such that the surfaces may be repeatedly stuck together and pulled apart.

With the use of such an adhesive on the surfaces 19 and 23, the operation of the fastener strip and the proper proportions of the reaches 18, 19, 23 and 24 may be determined as follows: When wrapped about a reel, as illustrated at FIG. 9, the uncoated under surface 16 of the first reach 18 is sufficiently long to protectively embrace the film surface of a full reel by the first wrap. This first wrap of the fastener strip about the film exposes the opposing adhesive-coated connective reach 23 at the outer surface 17. It follows that upon completion of the first wrap about the film and at the commencement of further wrapping, the adhering reach 19 at the under surface 16 is brought against the adhering reach 23 of the outer surface 17 to tightly stick the reaches 19 and 23 together, with only the finger connecting tab 20 being disconnected. It follows that the extent of the outer-end, under-surface adhesive-coated reach 19 must be shorter in length than the inner-end, outer-surface, adhesive-coated reach 23, moreover, the length of the reach 19 will be established by the circumference of a reel having a minimum amount of film on it.

When the reel having a lesser amount of film wrapped upon it is used, as illustrated in FIG. 7, the uncoated under surface reach 18 will wrap itself more than once about the film and a portion of the adhesive coated outer surface reach 23 adjacent to the film will be overlapped. However, if this reach 23 is of the same length as the opposing under-surface uncoated reach 18, a full wrap of the adhesive-coated outer surface 23 will be exposed. It follows that the length of the outer-end, under-surface adhesive-coated reach 19 must not exceed that required to fully wrap a reel having a minimum amount of film upon it. With such proportions of the reaches as hereinabove set forth, the fastener strip 15 will be of a suitable length to connect with a reel having either a maximum, intermediate or minimum amount of film upon it.

The prior art is replete with adhesives for adhesive coated surfaces of various characteristics and including types of surfaces which will adhere to like coated surfaces but which will not adhere to unlike coated surfaces. A thin film of natural rubber is a good example of latex-type adhesive of this characteristic. However, it was found that such adhesives would invariably adhere to each other with a greater degree of tenacity than their adherence to the paper surfaces to which they were initially coated. Also, the commonly known adhesives were invariably of a type which would not lend themselves to repeated adherence and separation. At best, some latex type adhesives such as natural rubber would adhere and separate a few times and then ball up and separate from the paper to which they were applied. An investigation, however, led to the discovery that a butadiene styrene type latex adhesive which is marketed by the Chemical Division of the Goodyear Tire and Rubber Company under the trademark "Pliolite," could be modified with a small amount of gum arabic which was determined to be between one and two percent by weight of the Pliolite latex. An adhesive of the character desired was then obtained. This butadiene-styrene type of adhesive would adhere to the paper when applied thereto as an emulsion. However, after setting, the surface of the adhesive was sufficiently non-tacky so as not to stick to uncoated surfaces of paper and film. It would stick to a like-coated surface but with only a mild degree of adhesion, sufficient to accomplish the purpose at hand but insufficient to cause the adhesive to tear from the layers of paper to which it was applied whenever the surfaces were separated. Moreover, it would repeatedly adhere and separate several hundred times. It would appear that the small amount of gum arabic, when applied to the emulsion and dissolved therein, facilitated the adhesion of the butadiene-styrene elastomer to the paper but that upon drying the gum arabic functioned as an inert filler to reduce the natural adhesive characteristics of the butadiene-styrene elastomer. Amounts of gum arabic exceeding two percent in the mixture would so effect the elastomer that the adhesive would completely lose its adhesive characteritsics.

While I have now described my invention in considerable detail, however, others skilled in the art can devise alternate and equivalent constructions which are nevertheless within the spirit and scope of my invention. Hence, I desire that my protection be limited, not by the illustrations and constructions herein described, but only by the proper scope of the appended claims.

I claim:

1. A fastener strip of pliable, paper-like material for holding and protectively overlying a roll of film upon a reel by being wrapped around the roll, the roll of film having a maximum and a minimum circumference, the strip having a width substantially the same as a selected film roll and a length exceeding the maximum circumference of the film roll, and including a first longitudinal section at one end of the strip coated with a permanently tacky adhesive on one side thereof, adapted to permit the strip to be attached to an end of the film, an adjacent second longitudinal section of said strip coated with a cohesive adhesive on the said side thereof and being at least equal in length to the maximum circumference of the film roll, and a third longitudinal section of said strip adjacent to said second longitudinal section and coated with a cohesive adhesive on the opposite side of the strip and being of a length sufficient to substantially embrace the minimum circumference of the film roll.

2. In the strip defined in claim 1, said cohesive adhesive coated surfaces being adapted to adhere to each other with a limited degree of tenacity sufficient to permit the same to be separated.

3. In the strip defined in claim 1, including an uncoated gripping tab at the end of the strip.

4. In the strip defined in claim 1, wherein the cohesive adhesive coating of said second and third longitudinal sections are adapted to adhere to the surface of the strip at the sections where it is applied, adhere to like coated surfaces but not adhere to uncoated surfaces and wherein the degree of adherence to the applied surfaces exceeds that of adherence to like coated surfaces whereby to permit repeated connection and separation of the adhesive cohesive surface of the said third longitudinal section to and from the coated surface of the said second longitudinal section when the strip is connected to and wound about a film roll with the third longitudinal section overlying the second longitudinal section.

5. In the strip defined in claim 1, wherein the cohesive adhesive is a butadiene-styrene type elastomer having a small amount of gum arabic and not exceeding two percent dissolved in the mixture when the adhesive is in a liquid form.

6. A fastener strip of pliable paper-like material for holding a roll of film by being wrapped about the roll the roll of film having a maximum and minimum circumference, the strip having a width substantially the same as the film and a length which exceeds the maximum circumference of the film roll and comprising, in combination therewith,
   (a) means connecting a short longitudinal section at one end of the strip to the end of the film to constitute a continuation thereof,
   (b) a second longitudinal section on the strip extending from the point of film connection to form a reach having a length at least as great as the maximum circumference of the film roll with the inner surface thereof being adapted to contact and protectively overlie the film roll, and the outer surface thereof being coated with a cohesive adhesive, and
   (c) a third longitudinal section beyond and adjacent to the said second longitudinal section having a length less than the maximum circumference of the film roll and having its inner surface coated with a cohesive adhesive adapted to adhere to the cohesive coated outer surface of said second longitudinal section when the strip is wrapped about the film roll.

7. In the combination set forth in claim 6, wherein the means connecting the strip to the film is a permanently tacky adhesive patch at the outer surface of said first longitudinal section.

8. The combination set forth in claim 6 including a short tab portion beyond said third section having both surfaces uncoated.

9. In the combination set forth in claim 6, said cohesive adhesive coated surfaces being formed with an adhesive characterized by adhering to a surface to which it is applied, adhering to a like coated surface, but not adhering to other uncoated surfaces, and wherein the tenacity of adherence to the surface to which it is applied exceeds that to which it will adhere when against a like coated surface, whereby to permit repeated contact and separation of one coated surface from another.

10. In the organization set forth in claim 9 wherein the adhesive is of a latex type having a small amount of soluble filler therein of a type which will not affect the adhesive properties of the adhesive when it is in an initial liquid form and is initially applied to the surfaces but which will reduce the adhesive properties thereof after the adhesive is dried.

11. In the organization set forth in claim 9 wherein the adhesive is a butadiene-styrene type elastomer having a small amount of gum arabic, not exceeding 2 percent, dissolved in the mixture when the adhesive is in a liquid form.

12. A fastener strip of pliable paper-like material for holding and protectively embracing a roll of film by being wrapped about the roll the roll of film having a maximum and a minimum circumference, the strip having the width substantially the same as the film and a length which exceeds the maximum circumference of the film roll and comprising, in combination therewith,
   (a) means connecting a short longitudinal section at one end of the strip to the ends of the film to constitute a continuation thereof,
   (b) a second longitudinal section on the strip extending from the point of film connection to form a reach having a length at least as great as the maximum circumference of the film roll with the inner surface therof being adapted to contact and protectively overlie the film roll, and
   (c) a third longitudinal section beyond and adjacent to said second longitudinal section having a length less than the maximum circumference of the film roll and being adapted to overlie the said second section when the strip is wrapped about the film roll, and (d) adhesive means on the strip adapted to connect the outer surface of the said second longitudinal section with the inner surface of the said third longitudinal section when the strip is completely wrapped about a film roll.

References Cited by the Examiner

UNITED STATES PATENTS

| | | | |
|---|---|---|---|
| 2,280,259 | 4/42 | Polley | 117—122 |
| 2,646,371 | 7/53 | McGarry | 117—122 |
| 2,847,106 | 8/58 | Yawger et al. | 117—122 |

WILLIAM D. MARTIN, *Primary Examiner.*
RICHARD D. NEVIUS, *Examiner.*